(12) United States Patent
Velamakanni et al.

(10) Patent No.: US 10,653,501 B2
(45) Date of Patent: May 19, 2020

(54) DENTAL ARTICLES AND METHODS OF USING SAME

(71) Applicant: 3M INNOVATIVE PROPERTIES COMPANY, St. Paul, MN (US)

(72) Inventors: Bhaskar V. Velamakanni, Woodbury, MN (US); Helmar B. Mayr, Kaufergin (DE); Holger Hauptmann, Sindelsdorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 112 days.

(21) Appl. No.: 15/519,063

(22) PCT Filed: Sep. 30, 2015

(86) PCT No.: PCT/US2015/053143
§ 371 (c)(1),
(2) Date: Apr. 13, 2017

(87) PCT Pub. No.: WO2016/060845
PCT Pub. Date: Apr. 21, 2016

(65) Prior Publication Data
US 2017/0224440 A1    Aug. 10, 2017

Related U.S. Application Data

(60) Provisional application No. 62/063,454, filed on Oct. 14, 2014.

(51) Int. Cl.
*A61C 5/30* (2017.01)
*A61C 5/70* (2017.01)
(Continued)

(52) U.S. Cl.
CPC .............. *A61C 5/30* (2017.02); *A61C 5/20* (2017.02); *A61C 5/70* (2017.02); *A61C 5/73* (2017.02);
(Continued)

(58) Field of Classification Search
CPC ... A61C 13/0001; A61C 13/09; A61C 13/081; A61C 13/087; A61C 5/77; A61C 5/00
(Continued)

(56) References Cited

U.S. PATENT DOCUMENTS 3,460,252 A    8/1969  Schneider
3,565,387 A    2/1971  Neustadter
(Continued)

FOREIGN PATENT DOCUMENTS

EP          1663053         8/2011
WO     WO 2005-018484       3/2005
(Continued)

OTHER PUBLICATIONS

Adamson, "S32. Aminoalkyl Tertiary Carbinols and Derived Products. Part I.3-Amino-1: 1-diphenylpropan-1-ols," Journal of Chemical Society, 1949, pp. S144-S155.
(Continued)

*Primary Examiner* — Edward Moran
*Assistant Examiner* — Matthew P Saunders
(74) *Attorney, Agent, or Firm* — 3M Innovative Properties Compa

(57) ABSTRACT

A dental article includes a shell defining a volume, the shell including a circumferential base and an incisal/occlusal region distal from the circumferential base. A hardenable dental composition is located within the volume of the shell, and an isolation film is located at the circumferential base of the shell.

19 Claims, 2 Drawing Sheets

(51) Int. Cl.

| | |
|---|---|
| *A61C 13/087* | (2006.01) |
| *A61C 13/09* | (2006.01) |
| *A61C 13/107* | (2006.01) |
| *A61C 5/20* | (2017.01) |
| *A61C 5/73* | (2017.01) |
| *A61C 8/00* | (2006.01) |
| *A61C 13/271* | (2006.01) |

(52) U.S. Cl.
CPC .......... *A61C 8/008* (2013.01); *A61C 13/0001* (2013.01); *A61C 13/087* (2013.01); *A61C 13/09* (2013.01); *A61C 13/26* (2013.01)

(58) Field of Classification Search
USPC .............................................. 433/183, 202.1
See application file for complete search history.

(56) References Cited

U.S. PATENT DOCUMENTS

| | | | |
|---|---|---|---|
| 3,585,723 A | 6/1971 | Simor | |
| 3,949,476 A | 4/1976 | Kahn | |
| 4,129,946 A | 12/1978 | Kennedy | |
| 5,100,320 A | 3/1992 | Martin | |
| 5,332,390 A | 7/1994 | Rosellini | |
| 5,487,663 A | 1/1996 | Wilson | |
| 5,538,129 A | 7/1996 | Chester | |
| 5,545,676 A | 8/1996 | Palazzotto | |
| 5,552,177 A | 9/1996 | Jacobs | |
| 5,636,736 A | 6/1997 | Jacobs | |
| 5,785,178 A | 7/1998 | Kvitrud | |
| 5,951,294 A | 9/1999 | Pierson | |
| 6,030,606 A | 2/2000 | Holmes | |
| 6,084,004 A | 7/2000 | Weinmann | |
| 6,187,836 B1 | 2/2001 | Oxman | |
| 6,572,693 B1 | 6/2003 | Wu | |
| 6,730,156 B1 | 5/2004 | Windisch | |
| 6,899,948 B2 | 5/2005 | Zhang | |
| 7,134,875 B2* | 11/2006 | Oxman ................ | A61C 19/003 433/226 |
| 7,321,004 B2* | 1/2008 | Melikechi ............ | A61C 19/003 522/1 |
| 7,494,339 B2 | 2/2009 | Dias | |
| 7,649,029 B2 | 1/2010 | Kolb | |
| 7,811,486 B2 | 10/2010 | Karim | |
| 2005/0042576 A1 | 2/2005 | Oxman | |
| 2005/0100868 A1* | 5/2005 | Karim ...................... | A61C 5/00 433/218 |
| 2010/0021868 A1 | 1/2010 | Kvitrud | |
| 2010/0062394 A1* | 3/2010 | Jones ................... | A61C 13/081 433/172 |
| 2010/0203480 A1 | 8/2010 | Schweitzer | |
| 2011/0207087 A1* | 8/2011 | Jones ....................... | A61C 5/00 433/222.1 |

FOREIGN PATENT DOCUMENTS

| | | |
|---|---|---|
| WO | WO 2010-057144 | 5/2010 |
| WO | WO 2011-059561 | 5/2011 |

OTHER PUBLICATIONS

Macosko, Rheology Principles, Measurements, and Applications, 92-98 (1994).
International Search Report for PCT International Application No. PCT/US2015/053143, dated Jan. 5, 2016, 7 pages.

* cited by examiner

DENTAL ARTICLES AND METHODS OF USING SAME

BACKGROUND

Dental articles including those comprising hardenable dental restorative materials are used extensively in restorative dentistry. For example, an infected tooth can be restored to its anatomical form and function with a number of available options such as a metal crown, an esthetic-coated metal crown, a composite crown, a ceramic crown, etc. These restorative techniques are detrimentally impacted by the presence of saliva, blood, and other fluid which may be present and/or arise during the course of a given restorative technique. The presence of these fluids may cause contamination of dental restorative materials, discoloration of the restoration, weak attachment of dental articles, unreliable bonding or debonding, decreased durability, increased dental visits, increased cost, etc. It is desirable to minimize or eliminate the detrimental impact of these fluids during the restoration.

SUMMARY

Some aspects of the present disclosure provide a dental article. The dental article can include a shell defining a volume, the shell comprising a circumferential base and an incisal/occlusal region distal from the circumferential base; a hardenable dental composition located within the volume, wherein the hardenable dental composition exhibits a yield stress from about 50 Pa to about 4,000 Pa at 37° C.; and an isolation film located at the circumferential base.

Some aspects of the present disclosure provide other dental articles. The dental article can include a shell defining a tooth-shaped volume, the shell comprising a circumferential base having a maximum diameter and an incisal/occlusal region distal from the circumferential base, wherein the shell is in the shape of a crown and the shell has a thickness of from about 0.1 mm to about 0.5 mm; a hardenable dental composition located within the tooth-shaped volume, wherein the hardenable dental composition exhibits a yield stress from about 50 Pa to about 4,000 Pa at 37° C. and the hardenable dental composition does not flow outside the shell during storage; and an isolation film located at the circumferential base, wherein the isolation film is not bonded to the circumferential base and the isolation film extends beyond the circumferential base by at least 50% of the maximum diameter.

Some aspects of the present disclosure provide a method using a dental article. The method can include providing the dental article of current disclosure and placing the dental article onto a dental structure, whereby a portion of the hardenable dental composition is displaced from the volume of the shell.

Other features and aspects of the present disclosure will become apparent by consideration of the detailed description.

Definitions

The term "dental article" includes, for example, temporary, intermediate, and permanent crowns, bridges, artificial teeth, veneers, temporary restorations, and implant healing caps.

The term "dental structure" includes, for example, but is not limited to natural and artificial teeth and portions thereof (e.g., a prepared natural tooth in the oral cavity of a patient), artificial teeth of typodonts or other models (e.g. casts, stone or wax models, and 3D printed model), implants, and implant abutments.

The term "hardenable" refers to polymerizable and/or crosslinkable.

The term "substantially" refers in typical embodiments of the present disclosure to a difference of not more than 20 percent, preferably not more than 10 percent, more preferably not more than 5 percent.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the present specification and attached claims are approximations that can vary depending upon the desired properties sought to be obtained by those skilled in the art using the teachings disclosed herein.

Also herein, the recitation of numerical ranges by endpoints includes all numbers subsumed within that range (e.g. 1 to 5 includes 1, 1.5, 2, 2.75, 3, 3.80, 4, and 5) and any range within that range.

The above summary of the present invention is not intended to describe each disclosed embodiment or every implementation of the present invention. The description that follows more particularly exemplifies illustrative embodiments.

DETAILED DESCRIPTION

Figure 1:
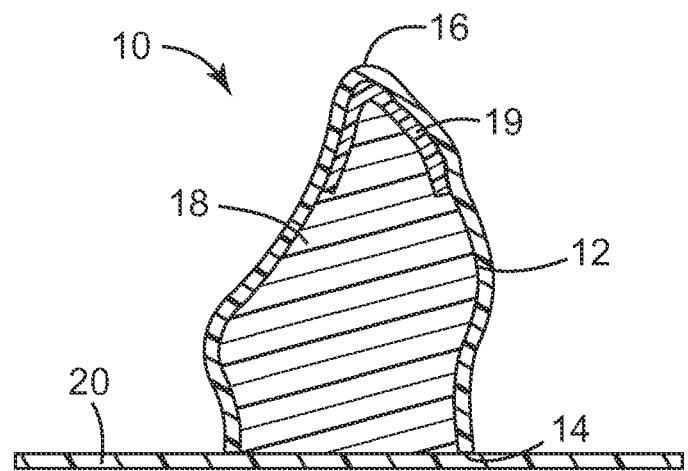
FIG. 1 is a cross-sectional view of an embodiment of a dental article of the present disclosure.

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be used and structural or logical changes may be made without departing from the scope of the present disclosure.

During restorative procedures, such as a typical indirect crown procedure, the presence of saliva, blood, and other fluid may cause a number of problems. For example, the presence of these fluids may contaminate dental articles used in the procedures. When the dental article is a crown, the presence of these fluids may cause discoloration of the restoration, a weak attachment of the crown to a dental structure and/or unreliable bonding or debonding of the crown, thereby decreasing durability of the restoration, increasing dental visits, and increasing expense.

The present disclosure generally relates to a dental article and methods of using the dental article, for example, in a tooth restoration procedure. Generally, the dental article can include a shell defining a volume, the shell comprising a circumferential base; a hardenable dental composition located within the volume; and an isolation film located at the circumferential base. Generally, the method of using the dental article can include placing the dental article of the present disclosure onto a dental structure. In some embodiments, the method further includes curing the hardenable dental composition, wherein the isolation film can remain in contact with at least a portion of the hardenable dental composition during the curing step. Particularly, the isolation film of the dental article can, for example, provide a barrier against saliva, blood, and other fluid which may be present and/or arise during the restoration and thus to protect the tooth to be restored, or similarly a plurality of teeth to be restored, relative to the surrounding tissue of the oral cavity, i.e., gingival tissue and neighboring teeth, to prevent, for example blood or saliva from reaching the tooth to be restored and to leave the area to be restored clean. In addition, when the dental article is a crown, the isolation film can provide a measured gap/space between the cured crown and a prepared tooth for cementation. Such small uniform gap can provide the appropriate gap/clearance for cementing the cured crown and prevent an overly tight fit of the cured crown to a prepared tooth (particularly if the hardenable dental composition is subject to shrinkage during curing).

In FIG. 1, one embodiment of a dental article 10 in the shape of a crown is illustrated in a cross-sectional view. The dental article 10 includes a shell 12 defining a volume that is generally in the shape of the tooth to be restored. Because teeth are found in a variety of anatomical shapes, the shell and its volume may take a variety of anatomical shapes that correspond to those of teeth. As such, those of skill in the art will recognize that the precise shape of the shell and its volume will vary depending on the desired anatomical shape of the tooth to be repaired. In alternative embodiments (not shown), the shape of the shell and its volume can be in a shape of a bridge, a veneer, a tooth facsimile, a crown or restoration, or an implant healing cap.

The shell 12 can include a circumferential base 14 defining an opening through which a tooth preparation of a tooth to be restored can be inserted and the dental article 10 is thus adapted to receive a prepared tooth in an oral cavity of a patient. In anatomical terms, the circumferential base 14 can be correlated to the cervical/gingival region of a tooth. The dental article 10 also includes an incisal/occlusal region 16 distal from the circumferential base 14.

The shell can be manufactured of any suitable material or materials that are structurally capable of maintaining the desired shape and not permanently deforming or collapsing (whether filled or unfilled with the hardenable dental composition) during storage and routine handling in a dental office. Examples of some suitable materials for the dental crown forms of the present invention include, but are not limited to acrylics, polyacrylonitriles, polyesters, polyamides, polyureas, polyolefins, polystyrenes, polycarbonates, polyvinylchloride, etc. The shell can be manufactured, for example, by vacuum forming or direct 3-dimensional printing from a library of shapes and sizes or based on anatomical fit to the restoration.

As manufactured, the shell may have one or more characteristics. For example, in some embodiments, the shell has a thickness of no greater than about 1 mm. In some other embodiments, the shell has a thickness of about 0.05 mm, about 0.1 mm, about 0.15 mm, about 0.2 mm, about 0.25 mm, about 0.3 mm, about 0.35 mm, about 0.4 mm, about 0.45 mm, about 0.5 mm, about 0.6 mm, about 0.7 mm, about 0.8 mm, about 0.9 mm, about 1 mm, or a range between and including any two of these values. In particular embodiments, the shell has a thickness of about 0.15 mm to about 0.35 mm. In some embodiments, the thickness of the shell is substantially constant or uniform. In certain instances, it may be desirable that the shell is not substantially distorted by a force required to seat the dental article onto a prepared tooth so that the structure of the dental article is not substantially distorted during the placement of the dental article. In some of these instances, the shell is not substantially distorted by a seating force of about 1 N, about 2 N, about 5 N, about 10 N, about 20 N, or a range between and including any two of these values. In particular embodiments, the shell is not substantially distorted at a seating force about 5 to about 15 N. Another characteristic of the shell of the dental article is transmissible to actinic radiation used to cure some hardenable dental compositions, i.e., the dental article may allow a practitioner to cure the hardenable dental composition within the shell before and/or after the dental article is removed from a dental structure.

In some embodiments, the shell may be continuous. Alternatively, in other embodiments the shell may be non-continuous, e.g., the shell having a vent through which the excess hardenable dental composition can be displaced outside when the dental article is placed onto a dental structure.

The dental article 10 also includes a mass of hardenable dental composition 18 located within the volume of the shell 12. In some embodiments, the hardenable dental composition 18 fully (100%) fills in the volume of the shell 12. In some embodiments, the hardenable dental composition 18 partially (e.g., at least 70%, at least 80%, or at least 90%) fills in the volume of the shell 12. In some embodiments, as delivered to a dentist or other practitioner, the hardenable dental composition 18 may be flowable, i.e., it is capable of flowing around a post or prepared tooth before being hardened. Generally, the hardenable dental composition 18 is uncured as supplied for use. Also, the hardenable dental composition 18 provided in the volume of the shell 12 may be limited to one type of hardenable dental composition, or, alternatively, the hardenable dental composition 18 may be a combination or layers of two or more different hardenable dental compositions to provide, e.g., desirable shading characteristics in a finished restored tooth and/or desirable flow behavior in the unhardened dental composition.

In some embodiments, the hardenable dental composition exhibits a yield stress at 37° C. about 25 Pa, about 50 Pa, about 75 Pa, about 100 Pa, about 200 Pa, about 500 Pa, about 1000 Pa, about 1500 Pa, about 2000 Pa, about 2500 Pa, about 3000 Pa, about 3500 Pa, about 4,000 Pa, or a range between and including any two of these values. When the shell is continuous, the hardenable dental composition needs to have a yield stress at 37° C. about 75 Pa, about 100 Pa, about 200 Pa, about 500 Pa, about 1000 Pa, about 1500 Pa, about 2000 Pa, about 2500 Pa, about 3000 Pa, about 3500 Pa, about 4,000 Pa, or a range between and including any two of these values. When the shell is non-continuous, the hardenable dental composition needs to have a yield stress at 37° C. about 50 Pa, about 75 Pa, about 100 Pa, about 200 Pa, about 500 Pa, about 1000 Pa, about 1500 Pa, about 2000

Pa, about 2500 Pa, about 3000 Pa, about 3500 Pa, about 4,000 Pa, or a range between and including any two of these values. If the yield stress of the hardenable dental composition is too high, then the viscosity of the hardenable dental composition may be too high and it may require too high force needing to seat the dental article on a prepared tooth, thus bringing an inconvenience to the patient/dentist. Another ramification of the yield stress of the hardenable dental composition being too high is that the hardenable dental composition may be difficult to flow around the prepared tooth during the placement or it may take much longer time for the hardenable dental composition to flow around the prepared tooth during the placement. If the yield stress of the hardenable dental composition is too low, the hardenable dental composition may leak outside the shell during storage.

In some embodiments, it may be desirable that the hardenable dental composition in the shell requires a seating force about 1 N, about 2 N, about 4 N, about 8 N, about 16 N, about 20 N or a range between and including any two of these values to seat the dental article onto a prepare tooth. In general, it is desirable that the hardenable dental composition does not flow outside the shell during storage. In some embodiments, the hardenable dental composition does not flow outside the shell during storage at room temperature for a period of at least about 1 day, at least about 2 days, at least about 3 days, at least about 1 week, at least about 2 weeks, at least about 1 month, at least about 6 months, at least about 1 year, at least about 2 years, or at least about 3 years.

Examples of suitable hardenable dental compositions that may be used in connection with the present invention include, e.g., the photopolymerizable and chemically polymerizable compositions disclosed for use as hardenable dental compositions (restoratives, fillers, etc.) as described in, e.g., U.S. Pat. Nos. 5,100,320, 5,545,676, 6,030,606, 6,084,004, 6,187,836, 6,572,693, 6,730,156, 6,899,948 and 7,134,875.

The hardenable compositions used in the methods of the present invention are in certain embodiments photopolymerizable, i.e., the compositions contain a photoinitiator (i.e., a photoinitiator system) that upon irradiation with actinic radiation initiates the polymerization (or hardening) of the composition. Such photopolymerizable compositions can be free radically polymerizable or cationically polymerizable. Preferably, the irradiation has a functional wavelength range from about 380 nm to about 520 nm.

Suitable photopolymerizable compositions may include epoxy resins (which contain cationically active epoxy groups), vinyl ether resins (which contain cationically active vinyl ether groups), and ethylenically unsaturated compounds (which contain free radically active unsaturated groups). Examples of useful ethylenically unsaturated compounds include acrylic acid esters, methacrylic acid esters, hydroxy-functional acrylic acid esters, hydroxy-functional methacrylic acid esters, and combinations thereof. Also suitable are polymerizable materials that contain both a cationically active functional group and a free radically active functional group in a single compound. Examples include epoxy-functional acrylates, epoxy-functional methacrylates, and combinations thereof.

In some embodiments, as shown in FIG. 1, the dental article may include an inset 19 made of a material with desired mechanical properties (i.e., higher strength or hardness). For example, in some of these embodiments, the inset 19 can be located within the shell 12, e.g., adjacent to the incisal/occlusal region 16 of the shell 12. Examples of suitable inset material that may be used in connection with the present invention include, but are not limited to, ceramic (e.g., zirconia and alumina), glass ceramic (e.g., lithium disilicate), or composite (e.g., LAVA® Ultimate available from 3M ESPE, Saint Paul, Minn.). The inset 19 may provide some technical advantages, for example, having a higher strength or wear resistance, providing a cushioning effect, or enhancing the distribution of chewing forces. While the inset 19 is illustrated in FIG. 1 as being part of the dental article 10, it should be understood that the dental article 10 need not include the inset 19 and some embodiments of the dental article 10 of FIG. 1 do not include the inset 19. Furthermore, in some cases, the embodiments described below and illustrated in FIGS. 2, 4 and 5 can also include an inset, similar to the inset 19 shown in FIG. 1.

The dental article 10 also includes an isolation film 20 located at the circumferential base 14. As discussed above, the isolation film can, for example, maintain a dry field around the prepared tooth by providing a barrier against saliva, blood, and other fluid during the restoration. In some embodiments, the hardenable dental composition may be in contact with the isolation film.

For certain embodiments, the isolation film can be a homopolymer film or a single layer film. Suitable polymers include linear low density polyethylene, ethylene vinyl acetate (EVA) copolymers, and the like. In some embodiments, the isolation film can be a multi-layer polymeric film. Suitable multi-layer polymeric film may include those described in International Publication No. WO 2010/057144.

In some embodiments, the isolation film is radially stretchable by at least 5 percent, 25 percent, 50 percent, 100 percent, 150 percent, 200 percent, 300 percent, 400 percent, 500 percent, 600 percent, 700 percent or 800 percent without causing a perforation in the isolation film. In some embodiments, the isolation film has a thickness of about 10 µm, about 25 µm, about 50 µm, about 75 µm, about 100 µm, about 125 µm, about 150 µm, about 175 µm, about 200 µm, about 400 µm, about 800 µm, about 1.0 mm, or a range between and including any two of these values. After the removal of the isolation film, the thickness of the isolation film can provide a measured gap/space between the cured crown and a prepared tooth for cementation.

In some embodiments, the isolation film can be non-transparent, colored, or include colored patterns. A colored isolation film or an isolation film with colored patterns can, for example, be visualized and remind dentists to remove the isolation film.

In some embodiments, as illustrated in FIG. 1, the circumferential base has a maximum diameter and the isolation film can extend beyond the circumferential base by at least 50% of the maximum diameter. Alternatively, in other embodiments, as illustrated in FIG. 2, the isolation film does not extend substantially beyond the circumferential base.

In some embodiments, the isolation film is not bonded to the circumferential base so that the excess hardenable dental composition can be displaced outside from the volume of the shell during placement. Alternatively, in other embodiments, the isolation film is bonded to the circumferential base so that the hardenable dental composition cannot be displaced outside through the base region of the shell.

In some embodiments, the isolation film can have a release additive coated on the side facing the hardenable dental composition prior to placement. Release additives include, for example, silicone oils. Other release additives include, for example, waxes, silicones, and extrudable fluorochemical polymers.

Figure 2:
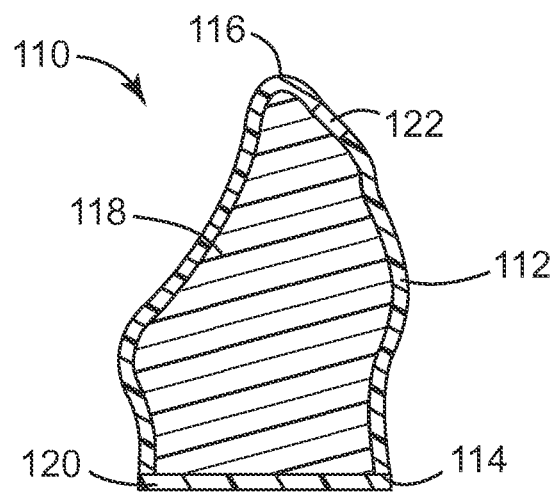
FIG. 2 is a cross-sectional view of another embodiment of a dental article of the present disclosure.

FIG. 2 is a cross-sectional view of one other embodiment of the dental article in the shape of a crown. The dental article 110 includes a shell 112 defining volume, along with a circumferential base 114 and an incisal/occlusal region 116 analogous to those discussed above. The volume of the shell 112 may contain hardenable dental composition 118 as packaged and provided to the practitioner. An isolation film 120 is located at the circumferential base 114. In these embodiments, the isolation film does not extend substantially beyond the circumferential base. In these embodiment, the isolation film 120 is bonded to the circumferential base 114 and the shell 112 have at least one vent 122 through which the hardenable dental composition 118 can flow outside the shell 112 when the dental article is placed onto a dental structure. In some of these embodiments, the vent 122 is located closer to the incisal/occlusal region 116 than the circumferential base 114.

Figure 3:
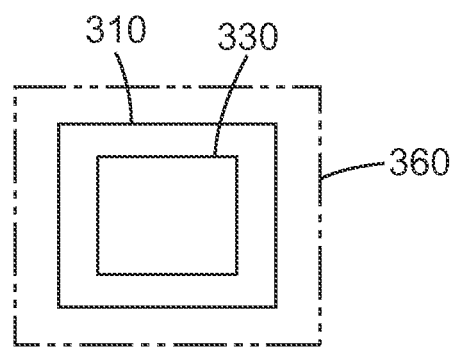
FIG. 3 is a schematic diagram illustrating a dental article located within a sealed package according to one embodiment of the present disclosure.

FIG. 3 is a schematic diagram depicting another concept that may be embodied in the dental articles of the present invention. As discussed above, it may be beneficial to provide a dental article 310 sealed therein when sent to the practitioner. Because hardenable dental compositions 330 are typically not stable enough to be exposed to atmosphere for long periods of time, the dental article 310 provided with hardenable dental composition 330 located therein may preferably be located within a package 360 as provided to the practitioner.

The package 360 may take the form of any suitable structure, e.g., envelope, blister pack, etc. known in the packaging arts. Examples of some suitable packaging materials may be described in U.S. Pat. No. 5,538,129 (Chester et al.); U.S. Pat. No. 5,552,177 Jacobs et al.); U.S. Pat. No. 5,636,736 (Jacobs et al.); and U.S. Pat. No. 5,785,178 (Kvitrud et al.), etc.

The package 360 may provide any characteristics required to maintain the working properties of the hardenable dental composition 330 of the dental article 310. For example, the package 360 may provide hermetically sealed volumes containing one or more dental articles. If the hardenable dental composition 330 is photocurable or photopolymerizable, the package 360 may also function as an actinic light barrier to provide protection from actinic radiation that may otherwise prematurely harden the hardenable dental composition 330. For example, package materials that are an actinic light barrier may transmit less than 1% of actinic radiation incident thereon into the interior of the package 360.

Figure 4:
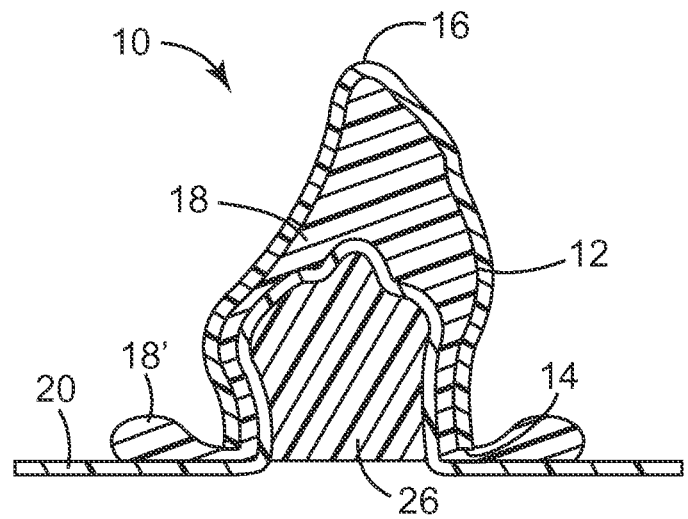
FIG. 4 is a cross-sectional view of a dental article after placement on a prepared tooth, according to one embodiment.

FIG. 4 is a cross-sectional view of the dental article 10 of FIG. 1 after placement over a dental structure 26. In some embodiments, the dental structure 26 is a prepared tooth. The prepared tooth may be prepared by any suitable process, e.g., cutting, grinding, shaping, etching, priming, coating with a dental adhesive, etc. An appropriate shape and size of a dental article is selected and provided. The dental article is then placed onto the prepared tooth, such that the prepared tooth is received in the volume of the shell (as seen in FIG. 4), whereby a portion of the hardenable dental composition 18' is displaced from the volume of the shell. In such embodiments, the hardenable dental composition is not in contact with the dental structure during the placing step, after the placing step, or both during and after the placing step. In some of such embodiments, it may be desirable that the hardenable dental composition is displaced without contacting living dental tissue (e.g., a prepared tooth and gingival tissue). If the hardenable dental composition is in contact with the dental structure or the living dental tissue during the placing step, after the placing step, or both during and after the placing step, the displaced hardenable dental composition may adhere to the dental structure or the living dental tissue and may be difficult to be removed from the dental article. In some of such embodiments, a portion of the hardenable dental composition is displaced from the volume of the shell onto the isolation film to prevent the hardenable dental composition from being in contact with the dental structure or the living dental tissue.

Alternatively, in other embodiments, the dental article 110 of FIG. 2 can be placed over a dental structure, whereby a portion of the hardenable dental composition is displaced from the volume of the shell through a vent onto the outer surface of the shell. In these embodiments, the hardenable dental composition is not in contact with the dental structure during the placing step, after the placing step, or both during and after the placing step. In some of these embodiments, it may be also desirable that the hardenable dental composition is displaced without contacting living dental tissue (e.g., a prepared tooth and gingival tissue).

In some embodiments, the isolation film is radially stretched when the dental article is placed onto the dental structure. In some of these embodiments, the hardenable dental composition is in contact with the isolation film during the placing step, after the placing step, or both during and after the placing step.

In some embodiments, after a portion of the hardenable dental composition is displaced from the volume of the shell onto the isolation film, the displaced hardenable dental composition can be removed (if desired) by any suitable instrument, e.g., a dental explorer.

In certain embodiments, the article is then at least partially hardened (e.g., cured) by exposing it to heat/radiation to cause activation of the initiator system. In some of these certain embodiments, the hardenable dental composition is at least partially cured inside the oral cavity of a patient, i.e., when the dental article is seated in place onto the dental structure. In some embodiments, the isolation film and the shell can remain in contact with at least a portion of the hardenable dental composition during the curing step. A potential advantage of hardening the hardenable dental composition while the isolation film and the shell are still in contact with the portion of the hardenable dental composition is that exposure of the hardenable dental composition to oxygen during the hardening process may be reduced or prevented because of the protection provided by the shell and isolation film. Exposure of some hardenable dental compositions to oxygen during hardening may not be desired. In addition, because the dental composition is hardened between the shell and the isolation film, the cured dental composition may be free of customary smear originating from oxygen inhibition layer used to protect the hardenable dental compositions from oxygen exposure. Hence, the surface of the cured dental composition may not require substantial polishing. Further, the isolation film retained in place during curing may prevent the unnecessary adhesion and/or bonding of the cured dental composition to the dental structure (as a result of the intimate contact between the hardenable dental composition and the dental structure). Furthermore, the isolation film can, for example, provide a barrier against saliva, blood, and other fluid from being in contact with the hardenable dental composition and/or the dental structure during the restoration. In some other embodiments, the hardenable dental composition can then be cured, typically by exposing it to a dental curing light for a few seconds, if desired, while in the oral cavity, and then removing it carefully from the oral cavity and exposing it for final cure. For example, the partially cured may be placed in a light curing chamber, optionally in combination with heat, to effect a complete cure.

After hardening, the dental article can be removed from the dental structure and the isolation film and/or the shell can also be removed from the dental article. In some embodiments, the isolation film can be removed in a single piece. Removing the isolation film can, for example, provide an appropriate gap/clearance for cementing the hardened dental compositions.

After the hardening steps, the hardened dental compositions, i.e., in a shape of a crown, can be further modified in shape/finished by contouring, grinding, trimming, etc., if desired. Once the final custom shape has been obtained, the finished crown can be polished, cleaned, painted, or surface treated, if required for the intended application. The intended application may require mounting, bonding, or otherwise attaching the custom shaped cured crown to a second object adhesively, mechanically, or by combination of both. The finished crown can then be cemented as is or lined with a suitable resin composition prior to placement in the mouth.

In certain embodiments, the shell may include at least one or more areas of weakness formed in the shell to facilitate the separation of the shell. The areas of weakness may define lines along which the shell can separate when tension is applied across the areas of weakness. The areas of weakness may take a variety of forms, e.g., thinned lines in which the wall thickness of the shell is reduced relative to the surrounding wall thickness, score lines, lines of perforations, etc. In yet another variation, the areas of weakness may be defined by a filament molded in the shell such that the shell preferentially separates along the filament. Other variations providing a means of separation may be envisioned by those skilled in the art.

Figure 5:
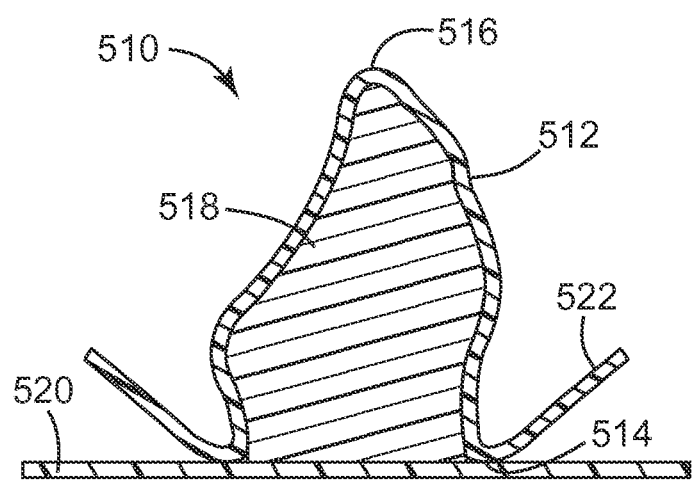
FIG. 5 is a cross-sectional view of an alternative embodiment of a dental article of the present application.

In FIG. 5, another embodiment of the dental article 510 in the shape of a crown is illustrated in a cross-sectional view. The dental article 510 includes a shell 512 defining volume, along with a circumferential base 514 and an incisal/occlusal region 516 similar to those discussed above. The volume of the shell 512 may contain hardenable dental composition 518 and an isolation film 520 is located at the circumferential base 514. The circumferential base 514 may include an optional flange 522. In some embodiments, the flange 522 may be used to both facilitate manipulation of the dental article during placement on a prepared tooth and to provide a location at which the shell may be gripped to apply the force required to separate the one or more lines of weakness in the shell. As such, it may be desirable to provide two or more flanges 522 on different sides of the circumferential base 514 of the shell 512 as depicted in FIG. 5. The flanges 522 may alternatively be located at a position removed from the base 514. In some other embodiments, flanges 522 are present for ease of removing shell 512 from dental article 510 at an appropriate time. In some embodiments, flanges 522 can extend in the facial/buccal direction, in the lingual direction, or in both the facial/buccal and lingual directions. In these some embodiments, flanges 522 do not interfere or contact with a neighboring tooth or teeth.

The following embodiments are intended to be illustrative of the present disclosure and not limiting.

EMBODIMENTS

Embodiment 1 is a dental article comprising:
 a shell defining a volume, the shell comprising a circumferential base and an incisal/occlusal region distal from the circumferential base;
 a hardenable dental composition located within the volume, wherein the hardenable dental composition exhibits a yield stress from about 50 Pa to about 4,000 Pa at 37° C.; and
 an isolation film located at the circumferential base.

Embodiment 2 is the dental article of embodiment 1, wherein the shell is in a shape of a crown, a bridge, a veneer, a tooth facsimile, a crown or restoration, or an implant healing cap.

Embodiment 3 is the dental article of embodiment 2, wherein the shell is in the shape of a crown.

Embodiment 4 is the dental article of any one of embodiments 1 to 3, wherein the shell has a thickness of no greater than about 1 mm.

Embodiment 5 is the dental article of any one of embodiments 1 to 4, wherein the shell is not substantially distorted by a seating force from about 2 N to about 20 N.

Embodiment 6 is the dental article of any one of embodiments 1 to 5, wherein the circumferential base includes at least one flange extending in the facial/buccal direction, in the lingual direction, or in both the facial/buccal and lingual directions.

Embodiment 7 is the dental article of any one of claims 1 to 6, wherein the isolation film is radially stretchable by at least 100 percent without causing a perforation in the isolation film.

Embodiment 8 is the dental article of any one of embodiments 1 to 7, wherein the isolation film is a single layer film or a multilayer film.

Embodiment 9 is the dental article of any one of embodiments 1 to 8, wherein the hardenable dental composition is in contact with the isolation film.

Embodiment 10 is the dental article of any one of embodiments 1 to 9, wherein the dental article is located within a hermetically sealed package.

Embodiment 11 is the dental article of any one of claims 1 to 10, wherein the dental article is located within an actinic light barrier package.

Embodiment 12 is the dental article of any one of embodiments 1 to 11, wherein the hardenable dental composition does not flow outside the shell during storage at room temperature.

Embodiment 13 is the dental article of any one of embodiments 1 to 12, wherein the dental article is adapted to receive a prepared tooth in an oral cavity of a patient and wherein the hardenable dental composition does not contact the prepared tooth.

Embodiment 14 is the dental article of any one of embodiments 1 to 13, wherein the circumferential base comprises a maximum diameter and the isolation film extends beyond the circumferential base by at least 50% of the maximum diameter.

Embodiment 15 is the dental article of any one of embodiments 1 to 14, wherein the shell is continuous.

Embodiment 16 is the dental article of any one of embodiments 1 to 15, wherein the isolation film is not bonded to the circumferential base.

Embodiment 17 is the dental article of any one of embodiments 1 to 13, wherein the isolation film does not extend substantially beyond the circumferential base.

Embodiment 18 is the dental article of any one of embodiments 1 to 13 or embodiment 17, wherein the isolation film is bonded to the circumferential base.

Embodiment 19 is the dental article of any one of embodiments 1 to 13 or embodiments 17 to 18, wherein the shell is discontinuous.

Embodiment 20 is the dental article of any one of embodiments 1 to 13 or embodiments 17 to 19, wherein the shell comprises a vent.

Embodiment 21 is a method of using a dental article, the method comprising:
  providing the dental article of any one of embodiments 1 to 20;
  placing the dental article onto a dental structure, whereby a portion of the hardenable dental composition is displaced from the volume of the shell.

Embodiment 22 is the method of embodiment 21, wherein the hardenable dental composition is not in contact with the dental structure during the placing step, after the placing step, or both during and after the placing step.

Embodiment 23 is the method of embodiment 21 or embodiment 22, wherein the hardenable dental composition is in contact with the isolation film during the placing step, after placing step, or both during and after the placing step.

Embodiment 24 is the method of any one of embodiments 21 to 23, wherein the hardenable dental composition is displaced without contacting living dental tissue.

Embodiment 25 is the method of any one of embodiments 21 to 24, wherein a portion of the hardenable dental composition is displaced from the volume of the shell onto the isolation film.

Embodiment 26 is the method of any one of embodiments 21 to 24, wherein a portion of the hardenable dental composition is displaced from the volume of the shell through a vent.

Embodiment 27 is the method of any one of embodiments 21 to 26, further comprising curing the hardenable dental composition to provide a cured dental article.

Embodiment 28 is the method of any one of embodiments 21 to 27, further comprising removing the shell, the isolation film, or both the shell and the isolation film from the cured dental article.

Embodiment 29 is a dental article comprising:
  a shell defining a tooth-shaped volume, the shell comprising a circumferential base
    having a maximum diameter and an incisal/occlusal region distal from the circumferential base, wherein the shell is in the shape of a crown and the shell has a thickness of from about 0.1 mm to about 0.5 mm;
  a hardenable dental composition located within the tooth-shaped volume, wherein the hardenable dental composition exhibits a yield stress from about 50 Pa to about 4,000 Pa at 37° C. and the hardenable dental composition does not flow outside the shell during storage; and
  an isolation film located at the circumferential base, wherein the isolation film is not bonded to the circumferential base and the isolation film extends beyond the circumferential base by at least 50% of the maximum diameter.

Embodiment 30 is a method of using a dental article, the method comprising:
  providing the dental article of embodiment 29;
  placing the dental article onto a tooth-shaped structure, whereby a portion of the hardenable dental composition is displaced from the tooth-shaped volume of the shell onto the isolation film without contacting living dental tissue;
  removing the displaced hardenable dental composition;
  fully curing the hardenable dental composition inside the oral cavity of a patient to provide a cured dental article;
  removing both the shell and the isolation film from the cured dental article; and
  cementing the cured dental article to the tooth-shaped structure.

EXAMPLES

The following examples are given to illustrate, but not limit, the scope of this invention. As used herein, all parts and percentages are by weight unless otherwise specified. All commercial materials were used as obtained from the vendor. Unless otherwise specified, materials can be obtained from Sigma-Aldrich Corp. (St. Louis, Mo.).

As used herein,

"BisGMA" refers to 2,2-bis[4-(2-hydroxy-3-methacryloyloxypropoxy)phenyl]propane (also referred to as bisphenol A diglycidyl ether methacrylate);

"TEGDMA" refers to triethyleneglycol dimethacrylate, CAS Reg. No. 109-16-0, obtained from Sartomer Co., Inc. (Exton, Pa.);

"UDMA" refers to diurethane dimethacrylate, CAS Reg. No. 41137-60-4, obtained under the trade designation "ROHAMERE 6661-0" from Rohm America LLC (Piscataway, N.J.); also available from Dajac Laboratories (Trevose, Pa.);

"PEG600 DM" refers to poly(ethylene glycol) dimethacrylate, average MW~600, obtained from Sartomer Co., Inc. (Exton, Pa.);

"CPQ" refers to camphorquinone, CAS Reg. No. 10373-78-1;

"DFIHFP" or "DPIPF6" refers to diphenyliodonium hexafluorophosphate, CAS Reg. No. 58109-40-3, obtained from Johnson Matthey, Alfa Aesar Division (Ward Hill, Mass.);

"IRGACURE 819" refers to a bis(2,4,6-trimethylbenzoyl) phenylphosphine oxide photoinitiator, obtained from Ciba Specialty Chemicals Corp. (Tarrytown, N.Y.);

"ENMAP" refers to ethyl (N-methyl-N-phenyl)aminopropionate, synthesized using known methods, such as those described by Adamson, et al.; JCSOA9; J. Chem. Soc.; 1949; spl. 144-152, which is incorporated herein by reference;

"BHT" refers to butylated hydroxytoluene (2,6-di-tert-butyl-4-methylphenol), CAS Reg. No. 128-37-0;

"BZT" refers to 2-(2-hydroxy-5-methacryloxyethylphenyl)-2H-benzotriazole, obtained from Ciba, Inc. (Tarrytown, N.Y.);

"S/T Silica/Zirconia Clusters" refers to silane-treated silica-zirconia nanocluster filler prepared essentially as described in U.S. Pat. No. 6,730,156 at column 25, lines 50-63 (Preparatory Example A) and at column 25, line 64 through column 26, line 40 (Preparatory Example B);

"S/T 20 nm Silica" refers to silane-treated silica nanoparticle filler having a nominal particle size of approximately 20 nanometers, prepared essentially as described in U.S. Pat. No. 6,572,693 at column 21, lines 63-67 (Nano-sized particle filler, Type #2); and "S/T Nanozirconia" refers to silane-treated zirconia nanoparticles, prepared essentially as described in U.S. Pat. No. 7,649,029 beginning at column 19, line 39 through column 20, line 41 (Filler I), except for the substitution of 3-methacryloxypropyltrimethoxysilane (available as GF-31 from Wacker Chemie AG, Munich, Germany) for the blend of Silquest A-174 and A-1230.

In general and as more fully detailed below, dental articles including: (i) a tooth-shaped polymeric shell; (ii) a hardenable dental composition disposed within the polymeric shell; and (iii) an isolation film were assembled and evaluated. The dental articles were evaluated for ease of use and suitability in crown restorations, and in particular, "cure-in-place" full crown restorations where the hardenable dental composition was cured while the article was in place on a tooth preparation. In this regard, the inventive dental article could be placed on a prepared tooth (natural, living, artificial, etc.), such that the isolation film was disposed between the prepared tooth surface and the hardenable dental composition. During placement of the article on the prepared tooth, the prepared tooth was received into the gingival opening of the tooth-shaped shell, resulting in displacement of a portion of the hardenable dental composition from the interior of the shell. Examples EX1-EX12, as well as comparative examples CE1-CE6 (further described below), included continuous tooth-shaped shells with the isolation films being unbonded to the shells. In these examples, a portion of the hardenable dental composition was displaced in a gingival direction, through the gingival opening of the shell, onto the isolation film (the film being oversized to accommodate the displaced hardenable dental composition). In the case of example EX13, the article included an isolation film which was bonded to the circumferential gingival base of the shell, the film being sized to match that the gingival opening (i.e., the film was not oversized and was sealed at the gingival opening of the shell). In this example, the shell was non-continuous, and included one or more ports or openings to accommodate displacement of the hardenable dental composition during placement of the dental article onto the tooth preparation (such that the hardenable dental flowed from the shell interior onto the exterior of the shell). Regardless of the shell type (i.e., continuous or non-continuous), the isolation film stretched (and/or slid) during placement without tearing or perforating, and provided a barrier between the hardenable dental composition and the tooth preparation such that the uncured composition was not in contact with the prepared tooth, surrounding tissues (e.g., gingiva or neighboring teeth), or fluids (e.g., blood or saliva). The hardenable dental composition was then cured while the dental article was in place on the tooth preparation (e.g., with blue light, through the shell). If needed, the article was held in place (e.g., with the aid of finger pressure) before and/or during curing. After curing, the article was gently removed from the tooth preparation, and the shell and isolation film removed from the cured, crown-shaped, dental composition. After finishing and polishing the crown (e.g., to remove any jagged edges and prepare the crown for proper anatomical fit), the cured crown was cemented into place on the tooth preparation using a cement such as RelyX Luting Plus (a resin-modified glass ionomer cement) or RelyX Unicem (an adhesive resin cement), each available from 3M ESPE (St. Paul, Minn.). In addition to providing a barrier between the hardenable dental composition and the tooth preparation (as well as barrier between the hardenable dental composition and fluids), the film can also aid in the removal of the article from the tooth preparation after curing and/or provide an appropriately sized gap in the cured crown to accommodate cement. In other words, a similar dental article lacking an isolation film suffers from a number of undesirable drawbacks, including: discoloration of the restoration, partial adhesion and/or bonding of the cured dental composition to the tooth preparation (as a result of the intimate contact between the hardenable dental composition and the tooth preparation); mechanical interlocking of the cured dental composition to the tooth preparation (particularly if the hardenable dental composition is subject to shrinkage during curing); and insufficient space between the tooth preparation and the interior of the cured crown to accommodate an appropriate amount of cement while still being able to fully seat the crown.

Tooth-Shaped Shells, S1-S4

Tooth-shaped polymeric shells were prepared via a vacuum forming or via 3D-printing. In the case of vacuum forming, shells were prepared using a Patterson vacuum forming unit (Item #090-9879, Patterson Dental Co., St. Paul, Minn.) with various thermoplastic sheet materials to form shells around standard, commercially available, stainless steel crowns (3M ESPE, St. Paul, Minn.). After vacuum forming, the tooth-shaped polymeric shells were separated from the thermoplastic sheet with the stainless steel crowns still in place (i.e., within the shell), using the gingival portion of the stainless steel crowns as cutting guides to fully separate the shells from the sheet. Stainless steel crowns were then removed from the pliable shells. For 3D-printing, tooth-shaped polymeric shells of a predetermined thickness were manufactured using a Objet EDEN 500V PolyJet and UV-cured VeroWhite resin (Stratasys, Eden Prairie, Minn.) on the basis of digital data obtained from standard, commercially available, stainless steel crowns. Testing and evaluation of the dental articles were generally performed on shells sized for the restoration a primary lower left second molar or a primary upper right first molar However, it is understood that tooth-shapes shells could be readily manufactured for both anterior and posterior teeth (either permanent or primary), and in multiple sizes for any particular tooth.

Except where explicitly stated to the contrary, all tooth-shaped polymeric shell examples generally: possessed continuous construction and relatively constant thickness (i.e., lacked holes or perforations on occlusal/incisal, buccal/labial, lingual, mesial, or distal surfaces); possessed an open base at the gingival portion through which to receive the tooth preparation (along with a portion the isolation film during placement); were transparent to actinic radiation; and were non-reactive to hardenable dental compositions, isolation films, and other dental article components.

Table 1 summarizes shells produced via vacuum forming or 3D-printing for a lower left second pediatric molar. Shells of varying thickness (0.15-0.5 mm) could be produced from a variety of polymeric materials (polyesters, polycarbonates, acrylates, polymer blends, etc.). For vacuum formed shells, shell thicknesses generally corresponded to the thicknesses of the thermoplastic sheets employed. In general, the shell material is not critical. However, it is desirable that the shells display sufficient strength such that they retain their shapes and do not permanently deform or collapse (whether filled or unfilled with the hardenable dental composition) during routine handling in a dental office. It is also desirable that the shell be is thin as possible such that the interproximal gap(s) between the crown restoration and immediately adjacent teeth is minimized. Of course, the shell must not be so thin such that shell would rupture during placement of the dental article (i.e., as a result of the increased forces experienced by the shell during seating on the tooth preparation).

TABLE 1

Tooth-Shaped Shells, S1-S4

| Shell | Shell Description |
|---|---|
| S1 | Clear/colorless vacuum-formed shell prepared from a clear polymer sheet (60% cellulose acetate and 40% diethyl phthalate), 0.5 mm in |

TABLE 1-continued

Tooth-Shaped Shells, S1-S4

| Shell | Shell Description |
|---|---|
|  | thickness × 127 mm width × 127 mm length Clear Splint Material, (available from Buffalo Dental Mfg Co., Syosette, NY) |
| S2 | Clear/colorless vacuum-formed shell prepared from a clear polycarbonate sheet, 0.25 mm in thickness (Makrofol HF312 G-4 020021, Bayer Material Sciences LLC, South Deerfield, MA) |
| S3 | Clear/colorless vacuum-formed shell prepared from a clear polycarbonate sheet, 0.375 mm in thickness (Makrofol HF312 G-4 020021, Bayer Material Sciences LLC, South Deerfield, MA) |
| S4a | Translucent 3D-printed shell, (0.15 mm thickness) prepared using VeroWhite acrylate-based resin (available from Stratasys Corp., Eden Prairie, MN) |
| S4b | Translucent 3D-printed shell, (0.20 mm thickness) prepared from VeroWhite acrylate-based resin |
| S4c | Translucent 3D-printed shell, (0.25 mm thickness) prepared from VeroWhite acrylate-based resin |
| S4d | Translucent 3D-printed shell, (0.35 mm thickness) prepared from VeroWhite acrylate-based |

Isolation Films, F1-F5

The dental articles included an isolation film, which in in vivo applications, would function to isolate the hardenable dental composition from saliva, blood, and other potential contaminants on, or adjacent to, the prepared tooth during and/or after placement of the article. Additionally, when the hardenable dental composition is cured while the article is in place on the tooth preparation, the isolation film which is disposed between the tooth preparation and the resultant cured dental composition (e.g., a crown) aids in the removal of the cured dental composition from the tooth preparation, since the cured dental composition is not in intimate contact with the surface of the tooth preparation. As noted above, the isolation film also provides a gap for which cement can be accommodated when the crown is finally cemented in place. In this regard, the film properties (e.g., thickness when stretched, thickness when unstretched, etc.) may be used to control or influence the size of the cementation gap; the cementation gap may be predetermined. As shown in Table 2, isolation films of various compositions and thicknesses were employed (0.015-0.12 mm). In all cases, the isolation films were compliant, stretchable, and tear-resistant. Additionally, the isolation films did not adhere to the hardenable dental compositions (e.g., paste P1) after photocuring with blue light.

TABLE 2

Isolation Films, F1-F5

| Film, # | Isolation Film Description |
|---|---|
| F1 | LDPE plastic wrap, 0.015 mm in thickness (available from VWR, Chicago, IL) |
| F2 | Paraffin film, 0.12 mm in thickness (available as ParaFilm "M" from American National Can, CT) |
| F3 | 9715 Cotran 19% EVA film, 0.075 mm in thickness × 89 mm wide (3M Health Care, Brookings, SD) |
| F4 | Nitrile sheet, 0.1 mm thickness (available as KC500 nitrile glove from Kimberly-Clark, Roswell, GA) |
| F5 | Silicone coated 7-layer polyethylene/ethylene vinyl acetate copolymer film, 0.05 mm thickness (available as Part# B429-BX261, Printpack, Atlanta GA) |

Hardenable Dental Compositions (Pastes), P1-P10

Hardenable dental compositions in the form of photocurable filled composite pastes were either obtained from commercial suppliers (i.e., pastes P1-P4, Table 3) or were experimentally prepared (i.e., pastes P5-10, Table 4). In the case of experimentally prepared pastes, 20-gram batches of each paste were prepared by combining the indicated components and mixing with a Speedmixer at 3300 rpm for three 1-minute cycles followed by 12-hr degassing in individual syringes at 25° C. The experimentally prepared pastes included identical photocurable resin packages and differed by filler loading (increasing from P5 to P10).

TABLE 3

Commercial Pastes, P1-P4

| Paste | Paste Description |
|---|---|
| P1 | Filtek Supreme Ultra Universal Restorative (3M ESPE, St. Paul MN) |
| P2 | Filtek Bulk Fill Flowable Restorative (3M ESPE, St. Paul, MN) |
| P3 | Sonic Fill Bulk Fill Composite (Kerr Dental, Orange, CA) |
| P4 | Self-supporting, malleable, light curable composite (obtained from a Protemp Directly Placed Crown available from 3M ESPE under part number 51046 St. Paul, MN) |

TABLE 4

Experimental Pastes P5-P10

| Paste | S/T Silica/ Zirconia Clusters Filler, wt. % | S/T 20 nm Silica Filler, wt. % | S/T Nanozirconia Filler, wt. % | Total Filler Loading, wt. % | Photocurable Resin*, wt. % |
|---|---|---|---|---|---|
| P5 | 55.26 | 6.34 | 3.4 | 65 | 35 |
| P6 | 59.5 | 6.83 | 3.68 | 70 | 30 |
| P7 | 62.9 | 7.22 | 3.89 | 74 | 26 |
| P8 | 64.6 | 7.41 | 3.99 | 76 | 24 |
| P9 | 66.3 | 7.61 | 4.1 | 78 | 22 |
| P10 | 68 | 7.8 | 4.2 | 80 | 20 |

*Photocurable Resin: 90/10 BisGMA/TEGDMA (11.82 wt. %); BisGMA (13.94 wt. %); UDMA (34.40 wt. %); BisEMA-6 (34.40 wt. %); PEG600 DM (3.74 wt. %); CPQ (0.22 wt. %); DPIHFP (0.35 wt. %); IRGACURE 819 (0.05 wt. %); ENMAP (0.81 wt. %); BHT (0.15 wt. %); and BZT (0.12 wt. %).
Yield Stress Evaluation of Pastes P1-P10

Dental practitioners generally desire good handling properties in hardenable dental compositions, as it often translates to time savings and patient satisfaction. For the dental articles of the present technology, it is typically desirable that the hardenable dental composition (i.e., the paste) flow from the shell during placement of the dental article when reasonable forces are applied, such that amount of force needed to place the article on the tooth preparation does not cause discomfort for the patient and/or the dental practitioner during the restoration procedure. For reasons of practicality, it is also desirable that the hardenable dental composition flow from the shell in a reasonable amount of time during placement of the dental article (it is typically desired that the rheological properties of the hardenable dental composition are such that the dental article is capable of being fully placed (seated) on the tooth preparation in less than about 30 seconds, and more preferably less than about 10 seconds). Not only is it desirable that the hardenable dental composition flow from the shell under a reasonable amount of applied force and in a reasonable amount of time, it is also desirable that the shell not permanently deform or rupture as a result of the forces experienced by the shell during placement of the article on the tooth to be restored. However and at the same time, it is preferable that the hardenable dental composition not flow out of the shell under the force of gravity alone (e.g., during storage or handling), particularly when the hardenable dental composition is not sealed within shell. The yield stress of a particular material is the minimum stress required to cause that material to flow, and is described in "Rheology Principles, Measurements, and Applications" by C. W. Macosko, VCH Publishers, Inc., New York, 1994, p. 92. If the stress due to gravity is below the yield stress of the material, then the material will not flow. The stress due to gravity, however, will depend on the mass of dental material being placed as well as the shape.

The yield stresses of pastes P1-P10 were evaluated as follows. Approximately 0.15 g of a given paste was loaded between 8 mm diameter parallel plates in an AR-G2 rheometer (TA Instruments, New Castle, Del.) and closed to a gap of ~1.0 mm. The parallel plates were lined with adhesive-backed sandpaper (9 μm in abrasive particle size) to minimize the paste from slipping at the plate surface during measurement. After scraping off excess paste, the sample was allowed to equilibrate at 37° C., after which time an oscillatory stress sweep from 1.0 to $10^5$ Pa was carried out at an angular frequency of 10 rad/s. The yield stress of a given paste was determined at the onset point on the graph of oscillatory stress (Pa) versus G'(Pa). The yield stresses for pastes P1-P10, as averages of three measurements, are tabulated in Table 5.

TABLE 5

Yield Stresses for Pastes P1-P10

| Paste | Oscillatory Yield Stress at 37° C., Pa (Std Dev) |
|---|---|
| P1 | 643.20 (34.81) |
| P2 | 57.39 (4.16) |
| P3 | 527.60 (6.97) |
| P4 | 12953.33 (196.6) |
| P5 | — |
| P6 | 78.86 (9.26) |
| P7 | 493.03 (45.34) |
| P8 | 868.50 (38.81) |
| P9 | 954.03 (30.88) |
| P10 | 1700.67 (68.63) |

As shown in Table 5, paste P4 (a self-supporting malleable paste) displayed the highest yield stress. Experimental pastes P6-P10 displayed increasing yield stresses as a function of the total filler loading. The yield stress of the lightly filled experimental paste P5 was too low to accurately measure.

Dental Article Assembly and Paste Retention Evaluation

Dental articles were assembled as follows. A given paste (P1-P10) was introduced through the circumferential opening at the gingival base of a given shell (S1-S4). The paste was added in a sufficient amount to fill the volume of the shell to 75% to 100%. Next, a piece of isolation film (F1-F5, approximately 25.4 mm×25.4 mm), was centered over the base of the shell, such that the film covered the circumferential opening and extended beyond the base of shell in mesial, distal, buccal/labial, and lingual directions. The isolation film was maintained in place by adhesion of the film surface to the paste within the shell. The dental article was placed on a flat surface, film/gingival side down. Since the isolation film was not bonded to the base of the shell, it was desired that the paste not flow out of the shell onto the isolation film under the force of gravity at room temperature (i.e., that the unsealed dental article not leak during use or storage). As shown in Table 6, dental articles which included pastes displaying low yield stresses (Comparative Examples CE1 and CE2 with pastes P2 and P5, respectively), leaked their pastes from their shells over 24-hr at room temperature and were generally not acceptable. On the other hand, dental articles including pastes with relatively higher yield stresses (Examples EX1-EX3 with pastes P1 and P8) retained the pastes within the shell over a 24-hr period at room temperature.

TABLE 6

Paste Retention Evaluation

| Example | Dental Article Description, Paste + Shell* + Film | Paste Retained in Shell? | Observations |
|---|---|---|---|
| CE1 | P2 + S1 + F3 | No | Not acceptable |
| CE2 | P5 + S1 + F3 | No | Not acceptable |
| EX1 | P1 + S1 + F3 | Yes | Acceptable |
| EX2 | P8 + S1 + F5 | Yes | Acceptable |
| EX3 | P8 + S4a + F5 | Yes | Acceptable |

*Shell: Primary upper left first molar

In Vitro Maximum Seating Force Testing

While it desirable that the yield stress of the hardenable dental composition be sufficiently high as to prevent leaking from the shell, it is also desirable that the yield stress not be so high as to require substantial seating forces during placement of the article which could cause patient (or dental practitioner) pain or discomfort at typical procedure temperatures (i.e., room temperature to about 37° C.). The maximum compressive force required to seat the assembled dental article onto a shoulder prepared upper left first molar in a pediatric dentoform (Part number M-PVR-2760, available from Columbia Dentoform, Long Island City, N.Y.) was measured in triplicate, both at 25 and 37° C. (each at 50% relative humidity). Dental articles tested included the same shell (S1) and isolation film (F1), but differed in pastes (P1, P3-P10) within the shell. An Instron testing machine (Model #5944, available from Instron Inc., Norwood, Mass.) at 10 mm/min crosshead speed was used to measure the maximum compressive seating forces to 1.5 mm deep. As shown in Table 7, at a given temperature, articles including pastes with higher yield stresses required increased maximum forces to seat the article on the prepared tooth. For example, CE3 (containing paste P4), displayed a very high maximum seating force, even at 37° C. (the seating force at 25° C. would be expected to be even higher). Thus, seating a dental article would likely be difficult for the dental practitioner and possibly painful for the patient. On the other hand, CE4 (containing paste P5) displayed a very low seating force even at low temperature (25° C.). This result is consistent with the observations in Table 6, where the yield stress of paste P5 was so low such that the paste leaked from the shell. Pastes with intermediate yield stresses gave rise to acceptable maximum seating forces (e.g., EX4-EX10).

TABLE 7

Maximum Seating Force Measurements (for a dental article sized for upper left first molar)

| Example | Dental Article Description, Paste + Shell + Film | Max. Seating Force at 25° C., N (Std Dev) | Max. Seating Force at 37° C., N (Std Dev) |
|---|---|---|---|
| CE3 | P4 + S1 + F1 | Not Determined | 34.56 (3.42) |
| CE4 | P5 + S1 + F1 | 0.69 (0.01) | Not Determined |
| EX4 | P6 + S1 + F1 | 1.93 (0.10) | Not Determined |
| EX5 | P7 + S1 + F1 | 4.36 (0.41) | Not Determined |
| EX6 | P10 + S1 + F1 | 29.45 (2.08) | Not Determined |
| EX7 | P1 + S1 + F1 | 12.81 (1.2) | 9.8 (1.8) |
| EX8 | P3 + S1 + F1 | 10.93 (1.97) | 6.75 (0.75) |
| EX9 | P8 + S1 + F1 | 8.75 (0.43) | 4.46 (0.82) |
| EX10 | P9 + S1 + F1 | 15.35 (1.88) | 6.56 (1.07) |

Dental Practitioner In Vitro Evaluations

Dental articles including the shell S1 and isolation film F3, but varying in experimental pastes, were evaluated by two dental practitioners (a prosthodontist and a pedodontist). The dental practitioners evaluated five dental articles per paste for ease of seating on a plastic tooth with shoulder preparation at room temperature, as well as for ease of cleaning of the displaced paste near the margin of the shell. Dental practitioner evaluations are summarized in Table 8 and are consistent with the data shown in Tables 6 and 7. In particular, CE5 containing a paste with relatively low yield stress was found to be too easy to seat on the tooth preparation, however the low viscosity "stringy" paste was difficult to clean up. In contrast, EX11 and EX12 which contained pastes with higher yield stresses (i.e., pastes P7 and P8, respectively) were seated without difficulty and cleaning of the excess paste was characterized as "easy" or "just right."

TABLE 8

Dental Practitioner Evaluations

| | Dental Article Description, Shell + Paste + Film | Ease of Seating Dental Article (n = 5) | | | Ease of Cleaning Excess Paste (n = 5) | | |
|---|---|---|---|---|---|---|---|
| Example | | Easy | Just Right | Difficult | Easy | Just Right | Difficult |
| CE5 (Same as CE2) | P5 + S1 + F3 | 5 | 0 | 0 | 0 | 0 | 5 |
| EX11 | P7 + S1 + F3 | 1 | 4 | 0 | 1 | 4 | 0 |
| EX12 | P8 + S1 + F3 | 1 | 4 | 0 | 3 | 2 | 0 |

From the preceding examples, it can be seen that dental articles which included pastes P1, P3, and P6-P10 were generally acceptable, in that the pastes neither leaked from the shells, nor did the pastes display such high yield stresses as to be unacceptable to a dental practitioner or likely to cause pain or discomfort to a patient. In contrast, pastes P2 and P5 were unacceptable due to leakage from the shell, while paste P4 displayed an unacceptably high yield stress. Table 8 includes of a summary of the dental articles tested, on the basis of the pastes employed.

TABLE 8

Summary of dental articles tested.

| Example | Dental Article Description, Paste + Shell + Film | Oscillatory Yield Stress of Paste at 37° C., Pa (Std Dev) | Paste Retained in Shell? | Perceived Seating Force | Overall evaluation |
|---|---|---|---|---|---|
| CE1 | P2 + S1 + F3 | 57.39 (4.16) | No | Very Low | Not acceptable |
| CE2/ CE5 | P5 + S1 + F3 | — | No | Very Low | Not acceptable |
| CE4 | P5 + S1 + F1 | — | No | Very Low | Not acceptable |
| CE3 | P4 + S1 + F1 | 12953.33 (196.6) | Yes | Very High | Not acceptable |
| CE6 | P4 + S1 + F3 | 12953.33 (196.6) | Yes | Very High | Not acceptable |
| EX1 | P1 + S1 + F3 | 643.20 (34.81) | Yes | Moderate | Acceptable |
| EX2 | P8 + S1 + F5 | 868.50 (38.81) | Yes | Moderate | Acceptable |
| EX3 | P8 + S4a + F5 | 868.50 (38.81) | Yes | Moderate | Acceptable |
| EX4 | P6 + S1 + F1 | 78.86 (9.26) | Yes | Moderate | Acceptable |
| EX5 | P7 + S1 + F1 | 493.03 (45.34) | Yes | Moderate | Acceptable |
| EX6 | P10 + S1 + F1 | 1700.67 (68.63) | Yes | High | Acceptable |

TABLE 8-continued

Summary of dental articles tested.

| Example | Dental Article Description, Paste + Shell + Film | Oscillatory Yield Stress of Paste at 37° C., Pa (Std Dev) | Paste Retained in Shell? | Perceived Seating Force | Overall evaluation |
|---|---|---|---|---|---|
| EX7 | P1 + S1 + F1 | 643.20 (34.81) | Yes | Moderate | Acceptable |
| EX8 | P3 + S1 + F1 | 527.60 (6.97) | Yes | Moderate | Acceptable |
| EX9 | P8 + S1 + F1 | 868.50 (38.81) | Yes | Moderate | Acceptable |
| EX10 | P9 + S1 + F1 | 1700.67 (68.63) | Yes | Moderate | Acceptable |
| EX11 | P7 + S1 + F3 | 493.03 (45.34) | Yes | Moderate | Acceptable |
| EX12 | P8 + S1 + F3 | 868.50 (38.81) | Yes | Moderate | Acceptable |

In Vitro Crown Pull-Off Studies (Curing and Cementation)

Performance of the crowns obtained from the aforementioned dental articles was assessed by measuring the maximum tensile force required to separate the cemented crown from an artificial tooth. Plastic typodont teeth with the roots (pediatric lower right second molars) were used for the study. The tooth part of the typodonts were cut with either a chamfer or shoulder preparation. The prepared plastic teeth were replicated with Z250 dental composite (available from 3M ESPE, St Paul, Minn.) via a cast and cure approach. The individual composite (Z250) tooth-root structures with only the root portion were firmly cemented upright in molds of 2-part methacrylate composite (3-in dia.×3-in high). Five each of composite teeth were cemented in the molds for the chamfer or for the shoulder preparations. Each of the cemented composite tooth preparations was restored in the manner previously described, employing dental articles assembled from shell S1, paste P9, and film F5. In each instance, the paste was cured by exposing the lingual, occlusal, and buccal surfaces of the shell with blue light for 10 seconds using an EPILAR S-10 curing light (3M ESPE, St. Paul, Minn.).

Individual Z250 tooth preparations and its corresponding cured crown were bonded with a dental cement and was used for measuring the force required to separate the crown from the tooth preparation. Five cured crowns (ELR3 size of P9+S1+F5 construction) per tooth prep were used for the bonding study with a self-adhesive cement (RelyX Unicem, 3M ESPE, St. Paul, Minn.).

The cement was dispensed into the crown inside cavity with an auto-mix delivery tip. Each crown with cement was placed on its corresponding tooth preparation with proper lingual-buccal alignment and was firmly pressed into place. After waiting 3 minutes, the excess cement around the crown margin was cleaned with a micro brush and the bonded crown/tooth preparation assembly was transferred into a humidity chamber (37° C. at 95% relative humidity) for 30-min for the cement to harden under self or dark cure mode. After the initial cement cure, the bonded samples were aged for an additional 24-hr at 37° C. under water prior to use in crown pull-off studies.

Tensile pull-off force of a cemented crown to a Z250 composite tooth prep was measured with an Instron testing machine (Model #1123, available from Instron Inc., Norwood, Mass.) at 2-mm/min crosshead speed at 25° C. and 50% relative humidity. The cylindrical methacrylate composite base was held stationary in the Instron testing machine, while the upper crown was held by a mechanical vice grip attached to the moving crosshead. The maximum force required to separate the crown from the composite tooth model was recorded. Five measurements per tooth preparation per cement and their corresponding failure modes were recorded. As shown in Table-6, RelyX Unicem provided superior bonding of the crown to the Z250 tooth prep to break off the supporting root than cohesive failure of the cement.

TABLE 6

| Cement | Sample Size, # | Chamfer Preparation Pull-Off Force, N (Std Dev) | Shoulder Prep Pull-Off Force, N (Std Dev) | Failure Mode |
|---|---|---|---|---|
| RelyX Unicem | 5 | 315.2 (65.4) | 467.0 (138.9) | Breakage of Z250 Composite Tooth |

Example 13

In contrast to the previously described dental articles which included a continuous tooth-shaped shell with a circumferential opening at base, a hardenable composite paste located within the volume and an isolation film covering beyond the circumferential base and not bonded to the base, this example describes a dental article with a tooth-shaped shell with an optional vent located away from the circumferential base, a hardenable dental composition located within the shell, and an isolation film covering only the circumferential opening of the shell and is bonded to the circumferential base. Isolation film, F5, was bonded to the circumferential base of shell, S4, containing hardenable paste, P8, with cyanoacrylate glue (Scotch-Weld, 3M, St. Paul, Minn.). Dental explorer tip was used to create a vent, approximately 0.3 mm diameter, on the lingual occlusal cusp. Because the hardenable paste is sealed in a tooth-shaped shell, the described dental article can accommodate hardenable pastes of lower yield stress (such as P2, P5 and P6) without paste leaking out of the shell or ease of cleaning up the excess paste around circumferential margin. This version of dental article can be also be cured, finished, and cemented to tooth prep in the manner previously described.

| Example | Dental Article Description, Paste + Shell + Film | Paste Retained in Shell? | Perceived Seating Force | Observations |
|---|---|---|---|---|
| EX13 | P8 + S4b + F4 | Yes | Moderate | Acceptable |

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A sealed package comprising an opening and an interior, and a seal overlying the opening, wherein the interior of the sealed package contains a dental article comprising: a shell in a shape of a crown, a bridge, a veneer, a tooth facsimile, or restoration, or an implant healing cap, the shell defining a volume and comprising a circumferential base and an incisal/occlusal region distal from the circumferential base, wherein the circumferential base of the shell defines an opening adapted to receive a dental structure; a hardenable dental composition located within the volume of the shell, wherein the hardenable dental composition exhibits a yield stress from 50 Pa to 4,000 Pa at 37° C., and wherein the hardenable dental composition comprises a photopolymerizable polymeric resin; and an isolation film, and an inset located within the shell of the dental article, wherein the inset comprises a material chosen from ceramics, glass ceramics, and composites of resins and ceramics.

2. The sealed package of claim 1, wherein the shell of the dental article comprises a material chosen from acrylics, polyacrylonitriles, polyesters, polyamides, polyureas, polyolefins, polystyrenes, polycarbonates, and polyvinylchloride, and wherein the shell is not substantially distorted by a seating force from 2 N to 20 N.

3. The sealed package of claim 1, wherein the circumferential base of the dental article includes at least one flange extending in the facial/buccal direction, in the lingual direction, or in both the facial/buccal and lingual directions.

4. The sealed package of claim 1, wherein the isolation film of the dental article is a single layer or multilayered polymeric film that is radially stretchable by at least 100 percent without causing a perforation in the isolation film.

5. The sealed package of claim 1, wherein the circumferential base of the dental article comprises a maximum diameter and the isolation film extends beyond the circumferential base by at least 50% of the maximum diameter.

6. The sealed package of claim 1, wherein the shell of the dental article is continuous.

7. The sealed package of claim 1, wherein the isolation film of the dental article is unbonded to the circumferential base.

8. The sealed package of claim 1, wherein the shell of the dental article comprises a vent.

9. The sealed package of claim 1, wherein the photopolymerizable polymeric resin of the dental article is chosen from epoxy, vinyl ether, and ethylenically unsaturated compounds.

10. The sealed package of claim 9, wherein the ethylenically unsaturated compounds are chosen from acrylic acid esters, methacrylic acid esters, hydroxy-functional acrylic acid esters, and hydroxy-functional methacrylic acid esters.

11. The sealed package of claim 4, wherein the polymeric film comprises linear low density polyethylene, ethylene vinyl acetate (EVA) copolymers.

12. A dental restoration system, comprising: (a) a dental article, comprising: (1) a shell in a shape of a crown, a bridge, a veneer, a tooth facsimile, or restoration, or an implant healing cap, the shell defining a volume and comprising a circumferential base and an incisal/occlusal region distal from the circumferential base, wherein the circumferential base of the shell defines an opening adapted to receive a dental structure; and (2) a hardenable dental composition located within the volume of the shell, wherein the hardenable dental composition exhibits a yield stress from 50 Pa to 4,000 Pa at 37° C., and wherein the hardenable dental composition comprises a photopolymerizable polymeric resin; and (b) an isolation film configured for placement between the circumferential base of the dental article and a dental structure during a restoration procedure; wherein the dental restoration system resides within a sealed package, and an inset located within the shell of the dental article, wherein the inset comprises a material chosen from ceramics, class ceramics, and composites of resins and ceramics.

13. The system of claim 12, wherein the shell of the dental article comprises a material chosen from acrylics, polyacrylonitriles, polyesters, polyamides, polyureas, polyolefins, polystyrenes, polycarbonates, and polyvinylchloride, and wherein the shell is not substantially distorted by a seating force from 2 N to 20 N.

14. The system of claim 12, wherein the circumferential base of the dental article includes at least one flange extending in the facial/buccal direction, in the lingual direction, or in both the facial/buccal and lingual directions.

15. The system of claim 12, wherein the isolation film of the dental article is a single layer or multilayered polymeric film that is radially stretchable by at least 100 percent without causing a perforation in the isolation film.

16. The system of claim 12, wherein the shell of the dental article comprises a vent.

17. The system of claim 12, wherein the photopolymerizable polymeric resin of the dental article is chosen from epoxy, vinyl ether, and ethylenically unsaturated compounds.

18. The system of claim 15, wherein the polymeric film comprises linear low density polyethylene, ethylene vinyl acetate (EVA) copolymers.

19. A dental article, comprising: a shell in a shape of a crown, a bridge, a veneer, a tooth facsimile, or restoration, or an implant healing cap, the shell defining a volume and comprising a circumferential base and an incisal/occlusal region distal from the circumferential base, wherein the circumferential base of the shell defines an opening adapted to receive a dental structure; an inset Within the shell, wherein the inset comprises a material chosen from ceramics, glass ceramics, and composites of resins and ceramics; a hardenable dental composition located within the volume of the shell, wherein the hardenable dental composition exhibits a yield stress from 50 Pa to 4,000 Pa at 37° C., and wherein the hardenable dental composition comprises a photopolymerizable polymeric resin; and an isolation film.

* * * * *